(12) United States Patent
Li

(10) Patent No.: US 12,045,042 B2
(45) Date of Patent: Jul. 23, 2024

(54) METHOD OF HANDLING TRANSACTION REQUEST, AND SEMICONDUCTOR PRODUCTION SYSTEM

(71) Applicant: CHANGXIN MEMORY TECHNOLOGIES, INC., Hefei (CN)

(72) Inventor: Huan-Cheng Li, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 374 days.

(21) Appl. No.: 17/497,164

(22) Filed: Oct. 8, 2021

(65) Prior Publication Data

US 2022/0026885 A1    Jan. 27, 2022

Related U.S. Application Data

(63) Continuation of application No. PCT/CN2021/088653, filed on Apr. 21, 2021.

(30) Foreign Application Priority Data

Apr. 21, 2020  (CN) .......................... 202010317228.9

(51) Int. Cl.
  *G05B 19/418*  (2006.01)
(52) U.S. Cl.
  CPC ... *G05B 19/4186* (2013.01); *G05B 19/41835* (2013.01); *G05B 19/41865* (2013.01); *G05B 2219/25202* (2013.01); *G05B 2219/25204* (2013.01); *G05B 2219/25394* (2013.01); *G05B 2219/2602* (2013.01)

(58) Field of Classification Search
  None
  See application file for complete search history.

(56) References Cited

U.S. PATENT DOCUMENTS

| 6,775,584 B1 | 8/2004 | Huang et al. |
| 7,218,981 B1 * | 5/2007 | Ho ..................... G05B 19/4187 700/99 |
| 7,369,912 B2 * | 5/2008 | Sherriff ............ G05B 19/41865 700/99 |

(Continued)

FOREIGN PATENT DOCUMENTS

| CN | 1848364 A | 10/2006 |
| CN | 100411092 C | 8/2008 |

(Continued)

OTHER PUBLICATIONS

ISR for International Application PCT/CN2021/088653 mailed Jul. 21, 2021.

(Continued)

*Primary Examiner* — Jason Lin
(74) *Attorney, Agent, or Firm* — Kilpatrick Townsend & Stockton LLP

(57) ABSTRACT

The present application discloses a method of handling a transaction request, including: performing an information exchange between a manufacturing execution system and a machine control system by an agent module; the information exchange including: sending a first transaction request by the machine control system to the agent module, and then sending the first transaction request by the agent module to the manufacturing execution system.

7 Claims, 5 Drawing Sheets

(56) References Cited

U.S. PATENT DOCUMENTS

| | | | | |
|---|---|---|---|---|
| 7,567,851 | B2* | 7/2009 | Schmidt | G05B 19/41865 |
| | | | | 700/121 |
| 7,899,568 | B2* | 3/2011 | Yamamoto | H01L 21/67276 |
| | | | | 700/121 |
| 9,665,668 | B2* | 5/2017 | Norman | G06F 30/20 |
| 9,709,335 | B2* | 7/2017 | Wu | H01L 21/67778 |
| 10,948,902 | B2* | 3/2021 | Halaby Senerman | G06Q 10/06 |
| 2005/0256599 | A1 | 11/2005 | Peng | |
| 2006/0161288 | A1* | 7/2006 | Imai | G05B 19/41835 |
| | | | | 700/121 |
| 2008/0126414 | A1* | 5/2008 | Parimi | G06Q 50/30 |
| 2009/0088870 | A1* | 4/2009 | Baier | G05B 19/41865 |
| | | | | 700/28 |
| 2009/0193443 | A1* | 7/2009 | Lakshmanan | G06F 9/544 |
| | | | | 719/330 |
| 2016/0352736 | A1* | 12/2016 | Mo | H04L 63/083 |

FOREIGN PATENT DOCUMENTS

| | | | | | |
|---|---|---|---|---|---|
| CN | 101236418 | A | | 8/2008 | |
| CN | 104166378 | A | | 11/2014 | |
| CN | 105223914 | A | | 1/2016 | |
| CN | 106371416 | A | * | 2/2017 | |
| CN | 106814646 | A | * | 6/2017 | G05B 19/04 |
| KR | 20130133579 | A | * | 12/2013 | |

OTHER PUBLICATIONS

English translation of Written Opinion of the International Search Authority in the international application No. PCT/CN2021/088653, mailed on Jul. 22, 2021.

* cited by examiner

METHOD OF HANDLING TRANSACTION REQUEST, AND SEMICONDUCTOR PRODUCTION SYSTEM

CROSS-REFERENCE TO RELATED APPLICATION

The present application is a continuation of International Patent Application No. PCT/CN2021/088653 filed on Apr. 21, 2021, which claims priority to Chinese Patent Application No. 202010317228.9 filed on Apr. 21, 2020. The entire contents of the aforementioned patent applications are incorporated herein by reference.

TECHNICAL FIELD

The present application relates to the field of semiconductor production system technologies, in particular to a method of handling a transaction request and a semiconductor production system.

BACKGROUND

As illustrated in FIG. 1, in order to reduce a burden of manpower, improve a quality of operation, and decrease a cost of manufacture, an Manufacturing Execution System 1' (MES) and a Machine Control System 2' (TCS) are generally employed in a semiconductor field to improve an operation efficiency.

However, in the case where the MES 1' and the TCS 2' send transaction requests simultaneously, the request of the MES 1' would be rejected by the TCS 2' to guarantee a safe operation and avoid a dead lock, and consequently, a reservation of the MES 1' is often caused to be unsuccessful. As can be seen from daily statistical data, during normal production, a semiconductor factory may have hundreds or thousands of times of the aforementioned reservation failures in a day. Thus, the problem described above has a great influence on a production efficiency.

SUMMARY

One aspect of the present application provides a method of handling a transaction request, including:
Performing an information exchange between a manufacturing execution system and a machine control system by an agent module; wherein the information exchange including: sending a first transaction request by the machine control system to the agent module, and then sending the first transaction request by the agent module to the manufacturing execution system.

Another aspect of the present application provides a semiconductor production system, including a manufacturing execution system, a machine control system, and an agent module, wherein:
the agent module is separately communicably connected to the manufacturing execution system and the machine control system, and is configured to fulfill an information exchange between the manufacturing execution system and the machine control system; and
the agent module is configured to receive a first transaction request sent from the machine control system and then send the first transaction request to the manufacturing execution system, and receive a first feedback result corresponding to the first transaction request wherein the first feedback result is sent from the manufacturing execution system and then send the first feedback result to the machine control system.

Details of one or more embodiments of the present application are presented in the accompanying drawings and descriptions below. Other features, objectives, and advantages of the present application will become apparent from the description, the accompanying drawings, and the claims.

BRIEF DESCRIPTION OF THE DRAWINGS

For better description and illustration of embodiments of the present application, references may be made to one or more of the accompanying drawings. However, additional details or examples for describing the accompanying drawings should not be considered as a limitation to a scope of any one of an innovation and creation of the present application, the embodiments described currently or preferred implementations.

DESCRIPTION OF THE EMBODIMENTS

In order to better understand objectives, technical solutions, and technical effects of the present application, further explanations and illustrations of the present application are given below in combination with the accompanying drawings and embodiments. Meanwhile, it is declared that the embodiments described below are merely used to explain the present application, and not to limit the present application.

Unless otherwise defined, all of the technical and scientific terms used herein have the same meanings as would generally understood by the person skilled in the technical field of the present application. In this document, the terms used in the description of the present application is merely for the purpose of describing particular embodiments, and is not intended to limit the present application. The term "and/or" as used herein includes any or all combinations of one or more relevant items which are listed.

In the case of using the terms "comprising", "having", and "including" described herein, another component or method may be added unless explicit limiting terms are used, e.g., "only", "consisting of" or the like. Unless mentioned contrarily, a singular term may also mean plurals, and may not be interpreted as a quantity of one.

Figure 1:
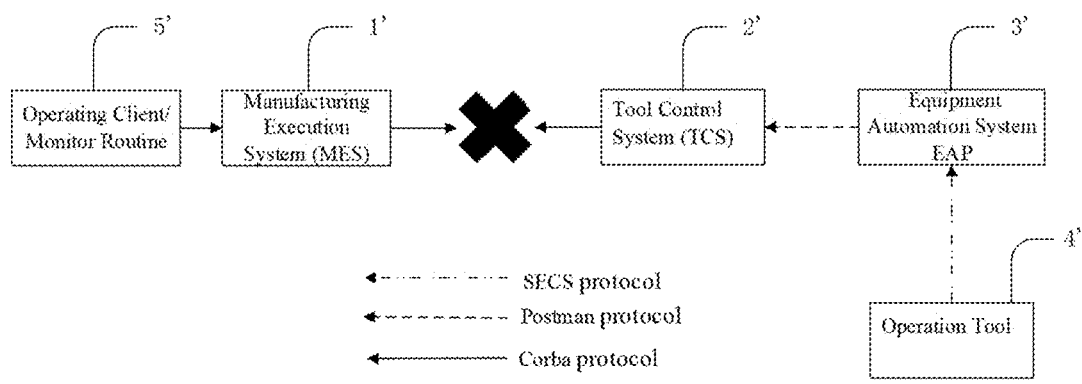
FIG. 1 is an operating principle diagram in the case where a machine control system and a manufacturing execution system send transaction requests simultaneously at their ends in a prior art.

As illustrated in FIG. 1, an existing semiconductor production system includes: a manufacturing execution system 1', a machine control system 2' connected to the manufacturing execution system 1', an operating client/monitor routine 5' connected to the manufacturing execution system 1', an equipment automation system 3' connected to the machine control system 2', and an operation machine 4' connected to the equipment automation system 3'; wherein a user sends a request to the manufacturing execution system 1' through the operating client, and an execution result of the manufacturing execution system 1' is displayed through the operating client; the monitor routine 5' is configured to control an automatic timing startup operation of the manufacturing execution system 1', so as to reserve and deliver to-be-produced goods to the operation machine 4' conforming to a production condition. Information interactions between the equipment and systems described above are achieved through respective communication protocols. For example, the manufacturing execution system 1' is separately communicated with the machine control system 2' and the operating client and monitor routine 5' through a Common Object Request Broker Architecture (CORBA) protocol, the equipment automation system 3' and the machine control system 2' are communicated through a Postman protocol, and the machine control system 2' and the operation machine 4' are communicated through an SECS protocol.

Figure 2:
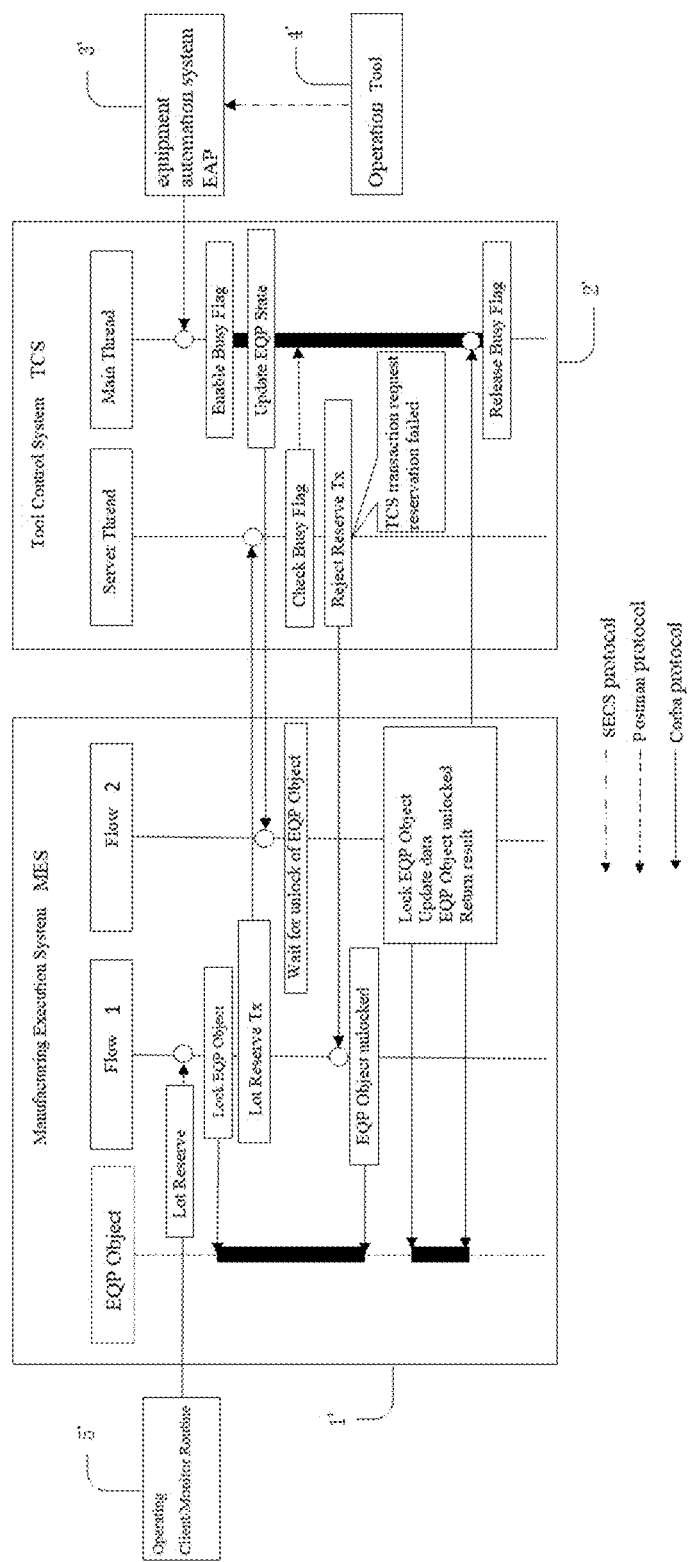
FIG. 2 is a sequential flow diagram in the case where the machine control system and the manufacturing execution system send transaction requests simultaneously at their ends in a prior art.

As illustrated in FIG. 2, during an operation of the existing manufacturing execution system 1' and the existing machine control system 2', in the case where the manufacturing execution system 1' and the machine control system 2' send a transaction request (Tx) to each other simultaneously, the following situations may exist: when the machine control system 1' sends "an update EQP state" to the manufacturing execution system 2', a main thread of the machine control system 2' will "enable busy flag" in advance to lock the main thread, and if the manufacturing execution system simultaneously sends "a lot reserve transaction request" (Lot Reserve Tx) to the machine control system, an EQP object of the manufacturing execution system 1' is locked at the same time; in order to avoid a dead lock, the machine control system 2' will first "check busy flag", and since it is checked that the busy flag has been already activated, the machine control system 2' will feedback "a reject reserve transaction request" (Reject Reserve Tx) to the manufacturing execution system 1' to prompt a failure of reserving the transaction request of the manufacturing execution system 1'. That is, in the case where the machine control system 1' and the manufacturing execution system 2' send transaction requests simultaneously at their ends, the main thread of the machine control system 1' and the EQP object of the manufacturing execution system 2' are locked at the same time, and a system program executes, by default, that the machine control system 2' rejects the reserve transaction request of the manufacturing execution system 1', and such a process directly causes a reservation failure for the manufacturing execution system.

Figure 4:
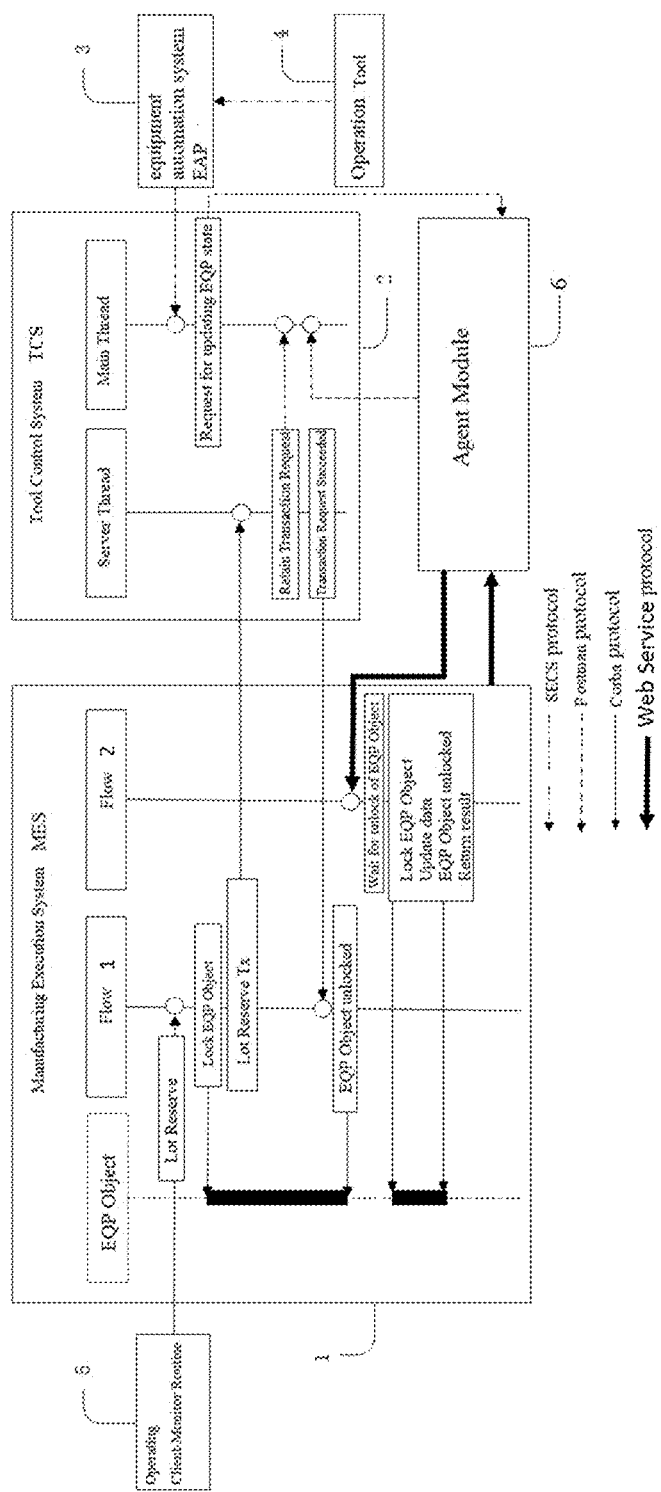
FIG. 4 is a sequential flow diagram of the method of handling transaction requests when the machine control system and the manufacturing execution system send the transaction requests simultaneously at their ends, according to an embodiment of the present application.
Figure 5:
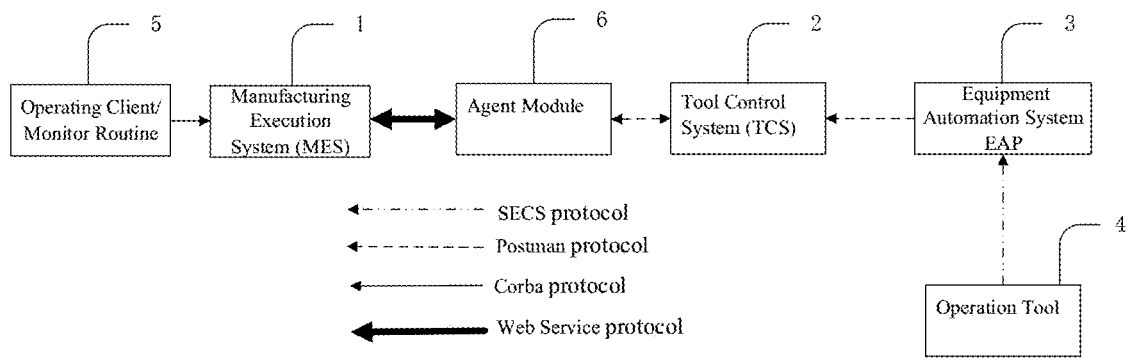
FIG. 5 is a structural block diagram of a semiconductor production system according to the present application.

In order to resolve the problem of the machine control system 2' rejecting the manufacturing execution system 1' when the machine control system 1' and the manufacturing execution system 2' send transaction requests simultaneously at their ends so as to avoid the dead lock, causing the reservation failure for the manufacturing execution system 1', please referring to FIGS. 4 and 5, the present application provides a method of handling a transaction request, the method including: performing the information exchange between the manufacturing execution system 1 and the machine control system 2 by the agent module 6. It should be understandable that the information exchange described here may be either parts or all of the information required to be interacted between the machine control system 2 and the manufacturing execution system 1.

In an embodiment, the information exchange of the method of handling the transaction request includes that: the machine control system 2 sends a first transaction request to the agent module 6, and the agent module 6 sends the first transaction request to the manufacturing execution system 1, thereby avoiding a situation where the machine control system 2 would otherwise be locked when sending the first transaction request, which effectively improves a success rate of reservation when the manufacturing execution system 1 sends a second transaction request to the machine control system 2, and thus, improves the production efficiency.

As an example, the information exchange may further includes that: the manufacturing execution system 1 sends a corresponding first feedback result to the agent module 6 after receiving and executing the first transaction request, and the agent module 6 then sends the first feedback result to the machine control system 2. In an embodiment, the agent module 6 receives the first feedback result from the manufacturing execution system 1 in real time.

In an embodiment, the method of handling the transaction request further includes: after the machine control system 2 sends the first transaction request and before the machine control system 2 receives the first feedback result, the machine control system 2 is available to receive the second transaction request sent from the manufacturing execution system 1.

When the machine control system 2 receives the second transaction request sent from the manufacturing execution system 1, the machine control system 2 responds to and executes the second transaction request, and then sends a second feedback result to the manufacturing execution system 1.

Since an external agent module 6 is used, for the purpose of matching a format of the information which is transmitted and received between the machine control system 2 and the manufacturing execution system 1, the operations of the agent module 6 according to an embodiment are specifically as follow: performing a first information format conversion on the first transaction request and then sending it to the manufacturing execution system 1; and performing a second information format conversion on the first feedback result and then sending it to the machine control system 2. Specifically, the first information format conversion includes a format conversion from Postman protocol to Web Service protocol; and the second information format conversion includes a format conversion from the Web Service protocol to the Postman protocol.

Next, operating principles and achieved technical effects of the method of handling the transaction request according to the present application will be elaborated in combination with a specific embodiment.

Figure 3:
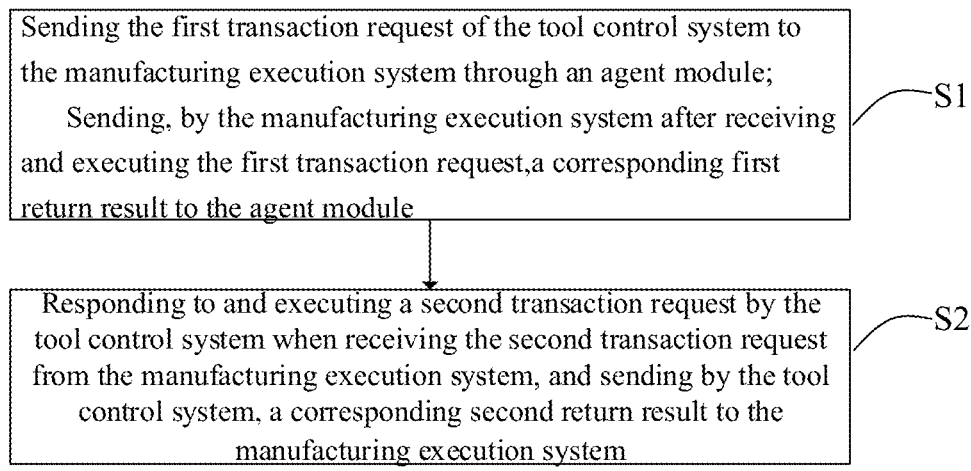
FIG. 3 is a flow diagram of a method of handling a transaction request according to the present application.

As illustrated in FIGS. 3 and 4, in this embodiment, the method of handling the transaction request specifically includes the following steps.

S1: the first transaction request of the machine control system 2 is sent to the manufacturing execution system 1 through the agent module 6; the manufacturing execution system 1 sends a corresponding first feedback result to the agent module 6 after receiving and executing the first transaction request.

As an example, the first transaction request may include "an update EQP state"; specifically, a format conversion from the Postman protocol to the Web Service protocol is performed on "the update EQP state", and an "update EQP state" request based on the Web Service protocol is then sent to a thread 2 of the manufacturing execution system 1; the manufacturing execution system 1 may provide a plurality of Web Service information reception modules for receiving the "update EQP state" request.

After the "update EQP state" request is sent through the agent module 6, a lock program in the main thread of the machine control system 2 may be canceled or not executed, thereby improving a success rate of reservation of the manufacturing execution system 1.

As an example, the first feedback result may include a feedback result obtained after the first transaction request is executed by the manufacturing execution system 2, such as a success (Normal End), a failure (Error Code) and a reason of failure (Error Description). Specifically, a result of execution is sent to the main thread of the machine control system 2.

S2: when the machine control system 2 receives a second transaction request from the manufacturing execution system 1, the machine control system 2 retains the second transaction request, responds to and executes the second transaction request, and sends a corresponding second feedback result to the manufacturing execution system 1, and the second feedback result may include a success of the transaction request (Normal End).

Here, after retaining the second transaction request, the machine control system 2 further forwards the second transaction request to the main thread for execution.

As an example, the second transaction request may include "a lot reserve transaction request (Lot Reserve Tx)"; when sending "the lot reserve transaction request" to the machine control system 2, the manufacturing execution system 1 may lock the EQP object at the same time; thus, the success of the transaction request of the manufacturing execution system 1 is returned to a thread 1 of the manufacturing execution system 1 from a server thread, so as to unlock the EQP object, facilitating a smooth execution of the first transaction request; the "lot reserve transaction request" is sent to a server thread of the machine control system.

S3: the agent module 6 sends the first feedback result of the manufacturing execution system 1 to the machine control system 2.

Specifically, a format conversion from the Web Service protocol to the Postman protocol is performed on "the feedback result", and "the feedback result" based on the Postman protocol is then sent to the thread 2 of the manufacturing execution system 1.

It can be understandable that in the method described above, steps S1 to S2 may be proceeded in parallel or in any order, both of which can realize the objective of the present application.

Prior to the step S1, the method may further include:

S0: the machine control system 2 sends the first transaction request to the agent module 6; specifically, the first transaction request is issued from the main thread of the machine control system 2.

The present application further proposes a semiconductor production system, including a manufacturing execution system 1, a machine control system 2, and an agent module 6, wherein:

the agent module 6 is separately communicably connected to the manufacturing execution system 1 and the machine control system 2, and is configured to fulfill an information exchange between the manufacturing execution system 1 and the machine control system 2.

Specifically, the agent module 6 is configured to receive a first transaction request sent from the machine control system 2 and then send the first transaction request to the manufacturing execution system 1, and receive a first feedback result corresponding to the first transaction request and sent from the manufacturing execution system 1 and then send the first feedback result to the machine control system 2.

In the semiconductor production system, the machine control system 2 is connected to the manufacturing execution system 1, and after the machine control system 2 sends the first transaction request and before the machine control system 2 receives the first feedback result, the machine control system 2 is available to receive the second transaction request sent from the manufacturing execution system 1.

The machine control system 2 responds to and executes the second transaction request when receiving the second transaction request, and then sends a corresponding second feedback result to the manufacturing execution system 1.

Figure 6:
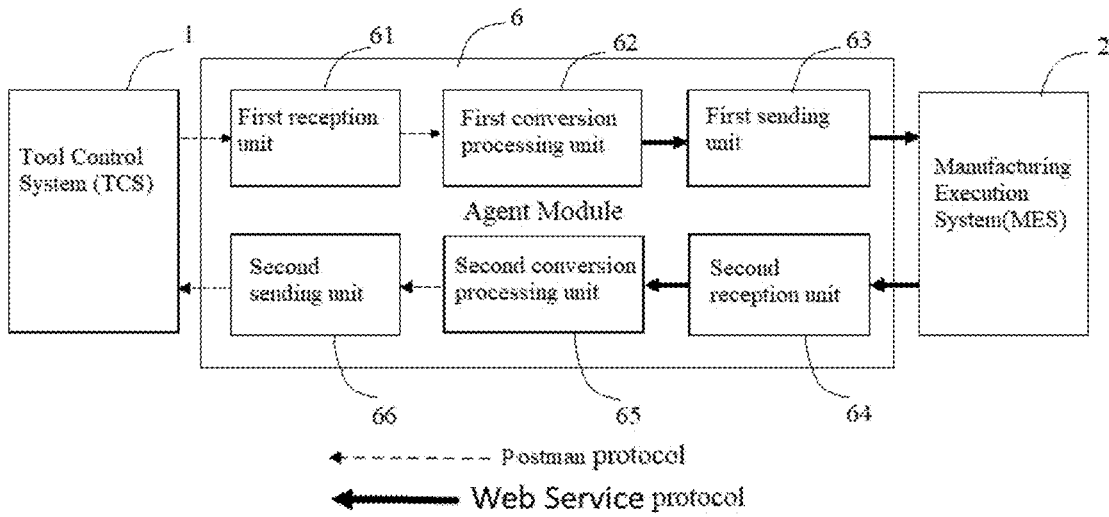
FIG. 6 is a structural block diagram of an agent module of a semiconductor production system according to an embodiment of the present application.

As illustrated in FIG. 6, in the semiconductor production system, the agent module 6 includes:

a first reception unit 61, an input terminal of which is connected to the machine control system 2 to receive the first transaction request sent from the machine control system 2;

a first conversion processing unit 62, an input terminal of which is connected to an output terminal of the first reception unit 61 to perform a first information format conversion on the first transaction request; and a first sending unit 63, an input terminal of which is connected to an output terminal of the first conversion processing unit 62 and an output terminal of which is connected to the manufacturing execution system 1 to send to the manufacturing execution system 1 the first transaction request subjected to the first information format conversion.

In the semiconductor production system, the agent module 6 further includes:

a second reception unit 64, an input terminal of which is connected to the manufacturing execution system 1 to receive a first feedback result of the manufacturing execution system 1;

a second conversion processing unit 65, an input terminal of which is connected to an output terminal of the second reception unit 64 to perform a second information format conversion on the first feedback result; and a second sending unit 66, an input terminal of which is connected to an output terminal of the second conversion processing unit 65 and an output terminal of which is connected to the machine control system 2 to send to the machine control system 2 the first feedback result subjected to the second information format conversion.

The embodiments of the present application have the following advantages: sending the first transaction request through the agent module instead of the machine control system avoids a situation where the machine control system would otherwise be locked when sending the first transaction request, thereby effectively improving the success rate of reservation when the manufacturing execution system sends the second transaction request to the machine control system, and thus, improving the production efficiency.

The ordinary skilled in the art can understand that parts or all of the flow of the method according to the embodiments described above may be implemented by related hardware that is instructed by a computer program. The computer program may be stored in a non-volatile computer-readable storage medium, and when executed, may include the flow as described in the embodiments of the aforementioned methods. A non-volatile memory may include a Read-Only Memory (ROM), a magnetic tape, a floppy disk, a Flash, an optical storage or the like. A volatile memory may include a Random Access Memory (RAM) or an external cache. For illustration, but not limitation, RAM may be in various forms, such as Static Random Access Memory (SRAM), Dynamic Random Access Memory (DRAM) or the like.

Technical features of the embodiments described above may be arbitrarily combined, but not all of the potential combinations are described so as to make the description concise. However, all of the combinations of these technical features should be considered as the scope recited in the specification as long as they have no conflict therein.

The embodiments described above merely show several implementations of the present application. The descriptions thereof are specific and detailed, but should not be interpreted as limiting the scope of the application patent. It should be noted that the person skilled in the art could further make several variations and improvements without departing the present inventive concept, and these variations and improvements belong to the scope sought for protection in the present application. Therefore, the protection scope of the present application shall be subject to the claims.

What is claimed is:

1. A method of handling a transaction request, comprising:
    performing an information exchange between a manufacturing execution system and a machine control system by an agent module;
wherein the information exchange comprises:
    sending a first transaction request by the machine control system to the agent module, and then sending the first transaction request by the agent module to the manufacturing execution system;
wherein the information exchange further comprises:
    the manufacturing execution system sending a corresponding first feedback result to the agent module after receiving and executing the first transaction request; and
    the agent module sending the first feedback result to the machine control system;
    wherein after the machine control system sends the first transaction request and before the machine control system receives the first feedback result, the machine control system is available to receive a second transaction request sent from the manufacturing execution system.

2. The method of handling the transaction request of claim 1, wherein:
    when the tool control system receives the second transaction request sent from the manufacturing execution system, the machine control system responds to and executes the second transaction request, and then sends a corresponding second feedback result to the manufacturing execution system.

3. The method of handling the transaction request of claim 1, wherein:
    the agent module performs a first information format conversion on the first transaction request and then sends the first transaction request to the manufacturing execution system; and
    the agent module performs a second information format conversion on the first feedback result and then sends the first feedback result to the machine control system.

4. The method of handling the transaction request of claim 3, wherein:
    the first information format conversion comprises a format conversion from a Postman protocol to a Web Service protocol; and
    the second information format conversion comprises a format conversion from the Web Service protocol to the Postman protocol.

5. A semiconductor production system, comprising a manufacturing execution system, a machine control system, and an agent module, wherein:
    the agent module is separately communicably connected to the manufacturing execution system and the machine control system, and is configured to fulfill an information exchange between the manufacturing execution system and the machine control system; and
    the agent module is configured to receive a first transaction request sent from the machine control system and then send the first transaction request to the manufacturing execution system, and receive a first feedback result corresponding to the first transaction request wherein the first feedback result is sent from the manufacturing execution system and then send the first feedback result to the machine control system;
    wherein the machine control system is connected to the manufacturing execution system. and after the machine control system sends the first transaction request and before the machine control system receives the first feedback result, the machine control system is available to receive a second transaction request sent from the manufacturing execution system; and
    the machine control system responds to and executes the second transaction request when receiving the second transaction request, and then sends a corresponding second feedback result to the manufacturing execution system.

6. The semiconductor production system of claim 5, wherein the agent module comprises:
    a first reception unit, an input terminal of which is connected to the machine control system to receive the first transaction request sent from the machine control system;
    a first conversion processing unit, an input terminal of which is connected to an output terminal of the first reception unit to perform a first information format conversion on the first transaction request; and
    a first sending unit, an input terminal of which is connected to an output terminal of the first conversion processing unit and an output terminal of which is connected to the manufacturing execution system to send to the manufacturing execution system the first transaction request subjected to the first information format conversion.

7. The semiconductor production system of claim 6, wherein the agent module further comprises:
    a second reception unit, an input terminal of which is connected to the manufacturing execution system to receive a first feedback result of the manufacturing execution system;
    a second conversion processing unit, an input terminal of which is connected to an output terminal of the second reception unit to perform a second information format conversion on the first feedback result; and
    a second sending unit, an input terminal of which is connected to an output terminal of the second conversion processing unit and an output terminal of which is connected to the machine control system to send to the machine control system the first feedback result subjected to the second information format conversion.

* * * * *